United States Patent [19]

Karpacheva et al.

[11] 3,870,638

[45] Mar. 11, 1975

[54] PULSATING FILTER-THICKENER

[76] Inventors: Susanna Mikhailovna Karpacheva, 2 Schukinsky Prozed, 2, kv. 88; Jury Georgievich Karkhachev, Astakovsky Pereulok 1/2, kv. 118; Valeryan Matveevich Muratov, 7 ulitsa Oktyabrskogo Polya, 5, kv. 6; Leonid Solomonovich Raginsky, Nikitinskya ulitsa, 16, kv. 29, all of Moscow, U.S.S.R.

[22] Filed: May 27, 1971

[21] Appl. No.: 147,636

Related U.S. Application Data

[63] Continuation of Ser. No. 819,321, April 25, 1969, abandoned.

[30] Foreign Application Priority Data

May 6, 1968    USSR............................1238756

[52] U.S. Cl.................. 210/333, 210/412, 210/433, 210/456
[51] Int. Cl............................................ B01d 29/38
[58] Field of Search ........... 210/320, 332, 333, 334, 210/356, 391, 412, 433, 456

[56]    References Cited
       UNITED STATES PATENTS
934,966    9/1909    Grabski......................... 210/433 X
1,214,152  1/1917    Genter.......................... 210/356 X
1,447,660  3/1923    Helzer.......................... 210/456 X
3,216,571  11/1965   Whiting et al. ................ 210/456 X
3,455,821  7/1969    Aremra.......................... 210/433 X FOREIGN PATENTS OR APPLICATIONS
527,417    7/1956    Canada.............................. 210/412

Primary Examiner—John Adee

[57]    ABSTRACT

A pulsating filter-thickener for continuous clarification of solutions, comprises a hollow vessel to be fed with and to discharge slurry. A hollow filter element is disposed in the vessel and two pulsating chambers are provided for cleaning the filter elements. One pulsating chamber communicates directly with the inner cavity of the filter element whereas the other pulsating chamber communicates directly with the exterior of the filtering element. The arrangement permits the simultaneous cleaning of the interior and the exterior of the filtering element.

8 Claims, 9 Drawing Figures

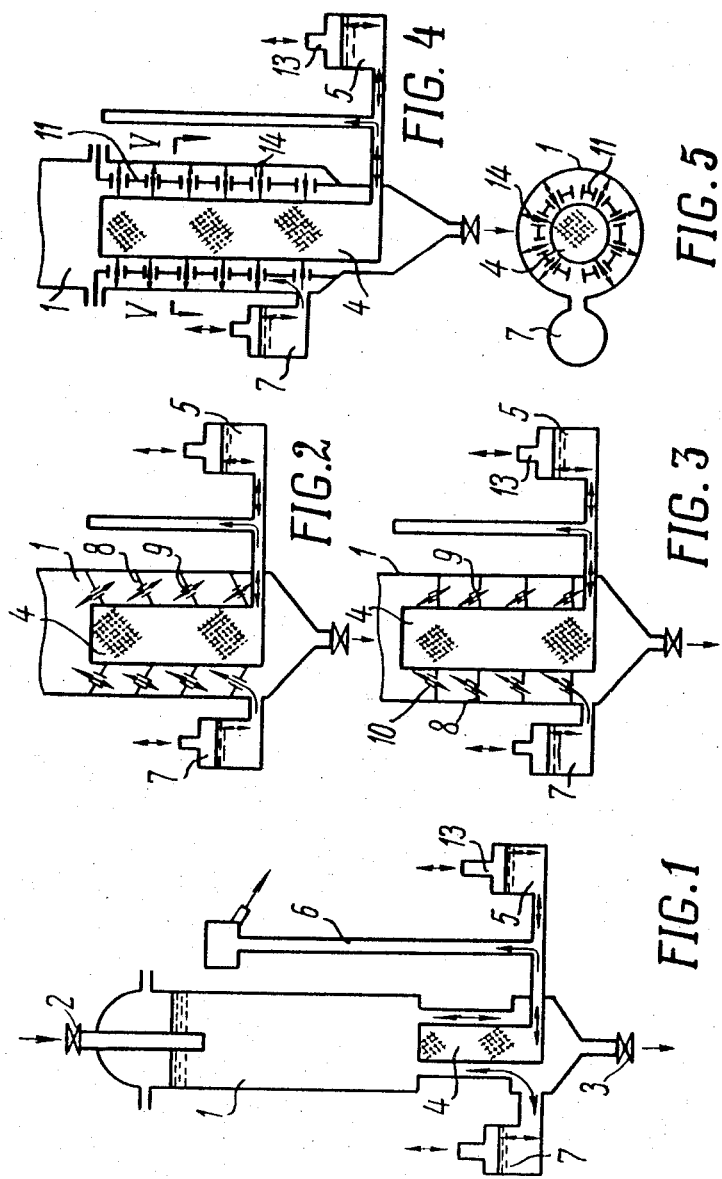

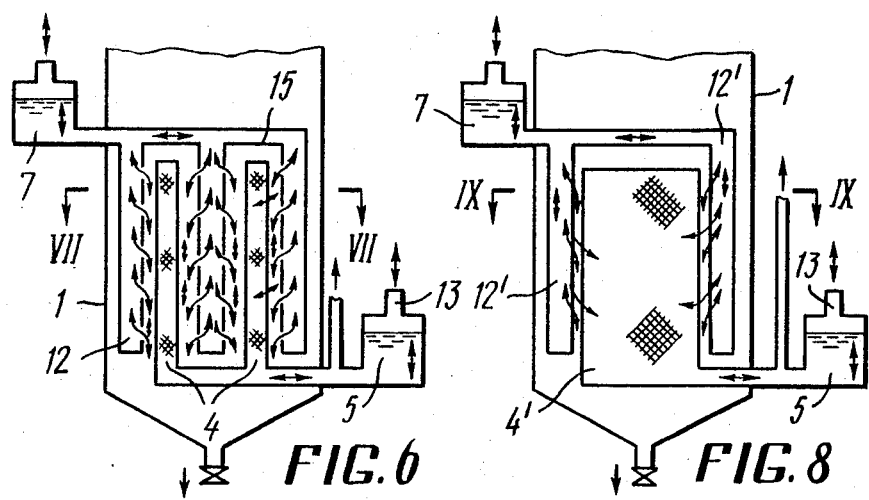
FIG. 6
FIG. 8
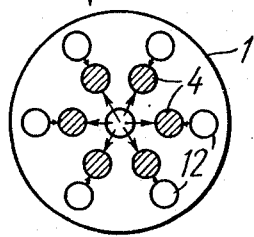
FIG. 7
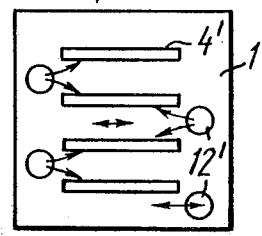
FIG. 9

3,870,638

PULSATING FILTER-THICKENER

This application is a continuation of Application Ser. No. 819321, filed Apr. 25, 1969, now abandoned.

This invention relates to chemical machinery and, more particularly, is concerned with filter-thickeners intended for the clarification of suspensions and slurries, particularly those containing tacky solids and slimy materials.

There is known a pulsating filter-thickerner which comprises a vessel fitted with connections for feeding the stock suspension and discharging the thickened suspension and accommodating filter elements whose inner surface communicates with a pulsator chamber, provision being made in said chamber for a clarified filtrate discharge connection.

In this prior art filter-thickener, stock suspension is continuously fed to the vessel, and the pulsator chamber is connected to a pulsator made in the form of a slide valve, which communicates alternately with a high-pressure and a low-pressure gas line, thereby generating in the chamber continuously alternating high- and low-pressure pulses. When the pressure in the pulsator chamber is reduced, there commences the flow of the filtrate free from suspended solids (clarified filtrate) into the chamber, while the solid particles contained in the slurry feed are retained in the pores or on the surface of a filter element. Pressure increase in the pulsator chamber causes the clarified filtrate that has entered the chamber during the preceding low-pressure phase to be forced into the discharge connection and, in part, back into the vessel through the pores of the filter element. This backwash recovers the filter element, since the return stream of the filtrate entrains solid particles from the filter medium pores and disengages the filter cake.

The known filter-thickener can be used to maximum advantage for the filtration of suspensions containing crystalline solids.

However, the design of the known filter-thickener does not make it possible to completely clean the filter element when the slurries being handled contain finely divided tacky solids, insofar as in this case the backwash is adequate to clean the pores, but the filtrate jets issuing from the pores are too weak to wash off the cake formation that adheres to the filter element surface, so that the throughput capacity of the filter undergoes continual diminution in the course of operation as a result of the gradual cake formation build-up.

It is the principal object of the present invention to provide a pulsating filter-thickener which will make it possible to continuously recover the filter element when the slurries being filtered contain not only crystalline solids, but tacky suspended materials as well.

With this and other objects in view, the present invention resides in a pulsating filter-thickener for the continuous clarification of solutions comprising a vessel fitted with stock slurry feed connections and thickened slurry discharge connections and accommodating at least one filter element whose inner cavity communicates with a pulsator chamber, which chamber is furnished with a filtrate discharge connection, wherein provision is made, according to the invention for an additional pulsator chamber which communicates with the vessel so that the slurry circumflowing the filter element is caused to pulsate.

It is expedient to provide in the vessel a plurality of plates disposed around the filter element so as to guide the stream of slurry. It is preferable that the plates be perforated.

It is further preferable to incline the plates in relation to the surface of filter elements.

Provision may be made in the apertures of the plates for guiding means, e.g. connecting pipes whose axes are inclined relative to the filter element surface.

It is likewise preferable to dispose around the filter element a perforated annular manifold which communicates with the additional pulsator chamber.

In the vessel cavity accommodating the filter elements, it is advantageous to dispose perforated tubular manifolds which communicate with the additional pulsator chamber.

The present invention is illustrated hereinbelow by the description of exemplary embodiments thereof to be taken in conjunction with the accompanying drawings, wherein:

FIG. 1 shows schematically a pulsating filter-thickener according to the invention;

FIG. 2 is a longitudinal sectional view of the vessel which houses a filter element and slurry stream guiding plates, according to the invention;

FIG. 3 is another form of disposing the plates around the filter element, according to the invention;

FIG. 4 is a longitudinal sectional view of the filter-thickener having a perforated annular manifold around the filter element, according to the invention;

FIG. 5 is the sectional view taken along line V—V of FIG. 4, according to the invention;

FIG. 6 is a longitudinal section of the filter-thickener having perforated tubular manifolds, according to the invention;

FIG. 7 is the sectional view taken along line VII—VII of FIG. 6, according to the invention;

FIG. 8 is another form of disposing the perforated tubular manifolds, according to the invention; and FIG. 9 is the sectional view taken along line IX—IX of FIG. 8, according to the invention.

The pulsating filter-thickener comprises a vessel 1 (FIG. 1) fitted with connections 2 and 3 for feeding the stock slurry and discharging the thickened slurry, respectively.

The vessel 1 accommodates at least one filter element 4 communicating with a pulsator chamber 5, which is fitted with a filtrate discharge connection 6. Provision is also made in the vessel 1 for an additional pulsator chamber 7, while around the filter element 4 may be disposed plates 8 (FIG. 2) furnished with apertures 9. It is feasible to set plates 8 at an angle to the surface of the filter element 4 and provide in apertures 9 guiding means 10 (FIG. 3), such as connecting pipes whose axes are inclined in relation to the surface of the filter element 4. The filter element 4 may be surrounded by a perforated annular manifold 11 (FIGS. 4, 5), which communicates with the additional pulsator chamber 7. The latter pulsator chamber may likewise be connected with a perforated tubular manifold 12 (FIGS. 6, 7) disposed in the cavity of the vessel 1, filter elements 4 being disposed in said cavity.

Where use is made of cartridge filters 4, the perforated tubular manifolds 12 should be interposed between said cartridge filters so that each filter element (cartridge) 4 will be surrounded by several tubular manifolds 12. In the tubular manifolds 12, provision is made for radial orifices, which arrangement is instrumental in generating, once a high-pressure pulse is sent to the pulsator chamber 7, a plurality of jets which sluice each cartridge filter from all sides.

In case recourse is had to flat filter elements 4' (FIGS. 8, 9), it is expedient to dispose perforated tubular manifolds 12' at the butt ends of and in the gaps between the elements. The perforations in the tubular manifolds 12' are directed towards the gap between the fitter elements 4'.

The pulsating filter-thickener, according to the invention, functions as follows.

When set in operation, the vessel 1 (FIG. 1) of the filter-thickener is charged or filled with the slurry which is continuously fed into it via the connection 2 and discharged, on being thickened, via the connection 3, the direction of slurry flow being indicated by arrows in FIG. 1. The slurry contained in the vessel 1 continuously circumflows the filter elements 4, which communicate with the pulsator chamber 5.

The pulsator chamber 5 communicates, in turn, via a connection 13 with a pulsator (not shown in the figure) consisting, for example, of a slide valve which alternately connects said chamber with a high- a low-pressure gas line, so that in the chamber 5 there arise continuously alternating high- and low-pressure pulses.

When the pressure in the pulsator chamber 5 drops below that in the vessel 1, the clarified filtrate starts flowing into the pulsator chamber 5, thereby raising the level of the liquid contained therein. Slurry passage through the filter element 4 causes suspended solids to settle on its surface and be retained in the pores of the filter medium.

The next slide valve stroke causes the pressure in the pulsator chamber 5 to exceed that in the vessel 1, so that the clarified filtrate that has entered the pulsator chamber 5 during the preceding low-pressure operation phase is expelled via the filtrate discharge connection 6 and partly forced back into the vessel 1 through the pores of the filter element 4. The clarified filtrate removes from the pores of the filter element 4 the solid particles previously entrapped therein and, where the slurry being handled contains crystalline solids, disengages the cake from the surface of the filter element 4, so that the thus-disengaged cake collects in the vessel 1.

Provision of additional pulsator chamber 7 is conducive to intensifying significantly the process of renewing the surface of the filter element 4, said intensification being particularly important where the slurries being filtered contain tacky suspended solids.

Pressure fluctuations in additional pulsator chamber 7 may be generated either by the pulsator connected to the principal pulsator chamber 5, in which case pressure pulses will be simultaneously sent to both the principal and additional pulsator chambers, or by an additional pulsator, so that the mode of pressure fluctuations in one pulsator chamber may differ from that in the other pulsator chamber.

Pressure pulses generated in the additional pulsator chamber 7 cause the slurry contained in said chamber to reciprocate, during which motion the slurry periodically enters the chamber 7 and then flows back to the vessel 1.

This situation results in setting up in the vessel 1 a pulsating fluid stream directed along the surface of the filter elements 4. Said stream disengages the cake from the filter element surface, the rate of the pulsating stream depending, all other factors being equal, upon the obstruction-free flow area of the cavity of the vessel 1, which houses the filter elements 4.

For each slurry type, the optimum flow area should be determined individually.

In some instances, the process of sluicing the surface of the filter element 4 is intensified by disposing around it said element plates 8 (FIGS. 2 and 3), which change the direction of the pulsating stream and, hence, make for flow velocity variation from one point of the filter element surface to another, thereby enhancing the process of filter surface cleaning.

It is practicable to augment the aforesaid process of filter element sluicing with the pulsating slurry stream by resorting to sluicing sprays. To do so, provision may be made in the plates 8 for apertures 9, which serve for breaking the entire pulsating stream or a part thereof into a plurality of separate jets, the thus-shaped jets being directed onto the surface of the filter element 4 either due to the fact that the plates 8 are inclined in reaction to the filter element surface (FIG. 2) or by the provision of the guiding means 10 (FIG. 3) in the apertures 9.

Another form of cake removal from the surface of filter element by sluicing sprays is presented in FIGS. 4 and 5.

In this embodiment of the present invention, the filter element 4 is surrounded by the perforated annular manifold 11 which communicates with the additional pulsator chamber 7.

A pressure pulse arising in the additional pulsator chamber 7 causes the slurry being handled to flow through apertures 14 in the manifold 11 and break into jets directed at an appropriate angle in relation to the surface of the filter element 4, whereas during the next low-pressure pulse the slurry flows back to the additional pulsator chamber 7 via the same apertures 14.

Cake removal from filter elements of diverse shapes by sluicing sprays may be realized in a different manner, viz., by providing in the present filter-thickener the perforated tubular manifolds 12 (FIGS. 6, 7), the sluicing sprays being ejected from the apertures in said manifolds.

Once a pressure pulse arrives in the additional pulsator chamber 7, the jets will issue from the apertures of the tubular manifold 12, enter the gap between the filter elements 4, and sluice the filter element surface.

Where use is made of the flat filter elements 4' (FIGS. 8, 9) and staggered manifolds 12', the absence of oppositely directed jets is conducive to causing the slurry to travel along a zigzag path and be uniformly distributed within the volume of the vessel 1 in the present filter-thickener.

The pulsating filter-thickener of the present invention makes it possible to effect continuously the clarification of slurries containing either crystalline or tacky suspended solids without stoppage for filter element cleaning or replacement and, hence, to decrease substantially operating costs.

The present filter-thickener is further advantageous in that it provides for a superior degree of thickening stock slurries. Due to that fact the slurries containing a high percentage of the solid phase undergo fluidization on being continously reciprocated.

The present filter-thickener may likewise be used as a filter-reactor, for example, for carrying out batch processes of precipitation in order to intensify the precipitation proper and subsequent separation of the reactants. The filter-thickener, according to the invention, is particularly useful as a filter-reactor for conducting continuous mass-transfer processes between a solid and a liquid phase, such as multi-stage dissolution, leaching, extraction, etc.

We claim:

1. A pulsating filter-thickener for continuous clarification of solutions, said thickener comprising a vessel; means for filling the vessel with a slurry to be clarified; at least one filter element having an inner cavity, said filter element being disposed in said vessel and immersed during filtration in the slurry; a first pulsator chamber connected to said inner cavity of said filter element to produce alternate high and low pressure pulses in said cavity and cause filtrate to enter the cavity and the first pulsator chamber during the low pressure pulses and flow back to the filter element during the high pressure pulses; a pipe connected to the first pulsator chamber for the discharge of filtrate therefrom during the high pressure pulses whereby a portion of the filtrate is withdrawn from the thickener during the high pressure pulses while another portion flows back through the filter element; a second pulsator chamber connected to said vessel to produce periodic pressure pulses to cause the slurry to flow in a pulsating, reciprocating fluid stream at the outside of the filter element and dislodge solid particles caked on the outside of the filter element; and means for discharging thickened slurry from said vessel.

2. A filter-thickener according to claim 1, comprising means disposed in the vessel around the filter element to direct said pulsating fluid stream onto the surface of said filter element.

3. A filter-thickener according to claim 2, wherein said means to direct the pulsating fluid stream comprises plates around the filter elements with apertures therein.

4. A filter-thickener according to claim 3, wherein said plates are inclined with respect to the outer surface of said filter element.

5. A filter-thickener according to claim 3, wherein said means to direct the pulsating fluid stream further comprises nozzles in said apertures facing said filter element and inclined with respect thereto.

6. A filter-thickener according to claim 2, wherein said means to direct the pulsating fluid stream comprises an annular manifold surrounding said filter element, said manifold having a perforate wall facing said filter element, said manifold being mounted in said vessel so as to connect said second pulsator chamber with the inner cavity of said manifold, whereupon the pulsating fluid stream is broken into individual streams by the perforate wall of said manifold to cause the individual streams to flow against the outer surface of the filter element.

7. A filter-thickener according to claim 2, wherein said filter element comprises a plurality of tubular filters, and said means to direct the pulsating fluid stream comprises a plurality of tubular manifolds disposed around said tubular filters, said manifolds being provided with apertures facing said tubular filters and connected to said second pulsator chamber.

8. A filter-thickener according to claim 2, wherein said filter element comprises a plurality of spaced, flat filters, and said means to direct the pulsating fluid stream comprises a plurality of tubular manifolds disposed adjacent said flat filters and provided with apertures facing said flat filters, said manifolds being connected to said second pulsator chamber.

* * * * *